(12) United States Patent
Feinberg et al.

(10) Patent No.: US 7,984,103 B2
(45) Date of Patent: Jul. 19, 2011

(54) SYSTEM AND METHOD FOR MANAGING DATA TRANSFERS BETWEEN INFORMATION PROTOCOLS

(75) Inventors: Jonathan Feinberg, Medford, MA (US); Frank Lawrence Jania, Chapel Hill, NC (US); Michael Muller, Medford, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 12/277,527

(22) Filed: Nov. 25, 2008

(65) Prior Publication Data

US 2010/0131666 A1    May 27, 2010

(51) Int. Cl.
*G06F 15/16* (2006.01)
(52) U.S. Cl. ......... 709/206; 709/203; 709/207; 709/223
(58) Field of Classification Search .................. 709/206, 709/207, 203, 223, 224
See application file for complete search history.

(56) References Cited

U.S. PATENT DOCUMENTS

| | | | | |
|---|---|---|---|---|
| 7,870,208 | B2 * | 1/2011 | Halcrow et al. | 709/206 |
| 2002/0133557 | A1 * | 9/2002 | Winarski | 709/207 |
| 2004/0148355 | A1 * | 7/2004 | Krause et al. | 709/206 |
| 2006/0031328 | A1 * | 2/2006 | Malik | 709/206 |
| 2006/0242663 | A1 * | 10/2006 | Gogerty | 725/34 |
| 2007/0016609 | A1 * | 1/2007 | Kim et al. | 707/104.1 |
| 2007/0208815 | A1 * | 9/2007 | Jania et al. | 709/206 |
| 2008/0034056 | A1 * | 2/2008 | Renger et al. | 709/217 |
| 2008/0096664 | A1 * | 4/2008 | Baray et al. | 463/42 |
| 2008/0256443 | A1 * | 10/2008 | Li et al. | 715/700 |
| 2009/0254345 | A1 * | 10/2009 | Fleizach et al. | 704/260 |
| 2009/0254624 | A1 * | 10/2009 | Baudin et al. | 709/206 |
| 2009/0319484 | A1 * | 12/2009 | Golbandi et al. | 707/3 |
| 2009/0327323 | A1 * | 12/2009 | Altinel et al. | 707/101 |

* cited by examiner

*Primary Examiner* — Lashonda T Jacobs
(74) *Attorney, Agent, or Firm* — Hamilton, Brook, Smith & Reynolds, P.C.

(57) ABSTRACT

A computer data handling method, system and apparatus are disclosed. A data item or information object are received in one protocol. Based on data contents, a protocol transfer module (engine) optimizes information presentation by transferring/converting the data item from the one protocol to a form of the data item in a different protocol. The resulting form (i.e. the data item/information object in the different protocol) optimally presents the data contents to an end-user. The end user reads the converted data item in the different protocol. The invention system enables the user to reply or otherwise further handle the data item in the initial protocol as desired. The initial protocol may be email and the resulting form of the data item may be one or more feed entries in machine-readable feeds specified by the user. The invention optimization effectively reduces email In-box clutter and streamlines reading in feed readers.

20 Claims, 5 Drawing Sheets

SYSTEM AND METHOD FOR MANAGING DATA TRANSFERS BETWEEN INFORMATION PROTOCOLS

BACKGROUND

Knowledge workers are overwhelmed by information. They are swamped with more and more messages in traditional information sources (protocols), such as email, and solutions providers are giving them new applications and new information sources—instant messaging, social software like Facebook, and "syndicated feeds". Often a particular application or source type has a measure of interest to the user that is different from other applications/sources. In general, emails, because they are generally directed "at" the user are more compelling than feeds broadcast generally. However, this distinction is not always true. A spam email holds considerably less interest for the user than a particular newsfeed item related to that user's job goals, for instance.

Email inboxes are cluttered. IBM (International Business Machines, Inc—Assignee) has tried several ways to remove some of the clutter to other services or venues, including Cattail (to share files without sending the files through email), activities, teamrooms, Quickr. Similar experiments and services have been tried and commercialized outside of IBM.

Where possible, people have used machine-readable feeds (e.g., Really Simple Syndication (RSS) and Atom Syndication Format) and feed readers for certain types of information. There is art known in gmail for providing access to mail content via a syndication format (e.g. Atom/RSS). This strategy has two advantages. First, messages that might have cluttered email are now in a more appropriate medium. Second, the feed reader has its own UI (user interface) affordances that make dealing with this type of information easier.

BRIEF SUMMARY

The key innovation of the present invention is in transferring information objects (data items) between different protocols, as appropriate, and in so doing optimize the information (data contents) being presented to the form of the protocol presenting it. The result is a reduction of unnecessary information, more consistent use of each protocol across the information presented there, and more efficient use of that protocol by the user.

For example, modern feedreaders are well suited to scanning large quantities of "news" postings by name, by summary, and, if the user chooses, by reading the content. Feedreaders are not, however, suited to creating and maintaining communication threads, as email applications are. Not all email requires that extra functionality though. Email broadcasts and reminders often, rather than informing the user, simply clutter the inbox and prevent the user from seeing more important information. Shifting such items from email protocol to feedreader protocol would reduce email in-box clutter and also streamline reading the items in the feedreader. The user becomes more efficient in both applications.

Moving from directed email to syndicated feeds is not an easy change. While syndicating content in feeds is one way to avoid email inundation, the sender does not always offer that as an option.

The disclosed invention is a system and method for generating feed objects (entries) from email content in a way that provides the greatest flexibility for the user. In one embodiment, the invention provides new methods for optimizing presentation of data contents by converting selected emails into feeds. Applicants describe embodiments based on a stand-alone web service, an enhancement of an email system, an enhancement of a feedreader, and a hybrid approach that involves both an email system and an enhancement of a feedreader. An additional advantage of the present invention is that email users can become publishers of feeds for their colleagues.

In one embodiment, the method is as follows:

Intercept or otherwise receive selected email messages to a user;

Optimize presentation of the selected email messages by converting the selected email messages into feed entries;

Enable the user to read the feed entries, using a feed reader (feed protocol); and Optionally, expose the feed entries to other users. The step of optimizing effectively reduces email in-box clutter and streamlines reading in feed readers.

In another embodiment, the present invention provides a computer data handling system, comprising:

a member receiving an information object in one protocol;

a protocol transfer module responsive to the received information object; and an output display member.

The protocol transfer module optimizes presentation of the contents of the received information object by transferring the received information object from the one protocol to a different protocol as a function of the contents of the received information object. The optimization by the protocol transfer module effectively reduces email in-box clutter and streamlines reading in feed readers. The output member displays to a user the transferred information object in the different protocol.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
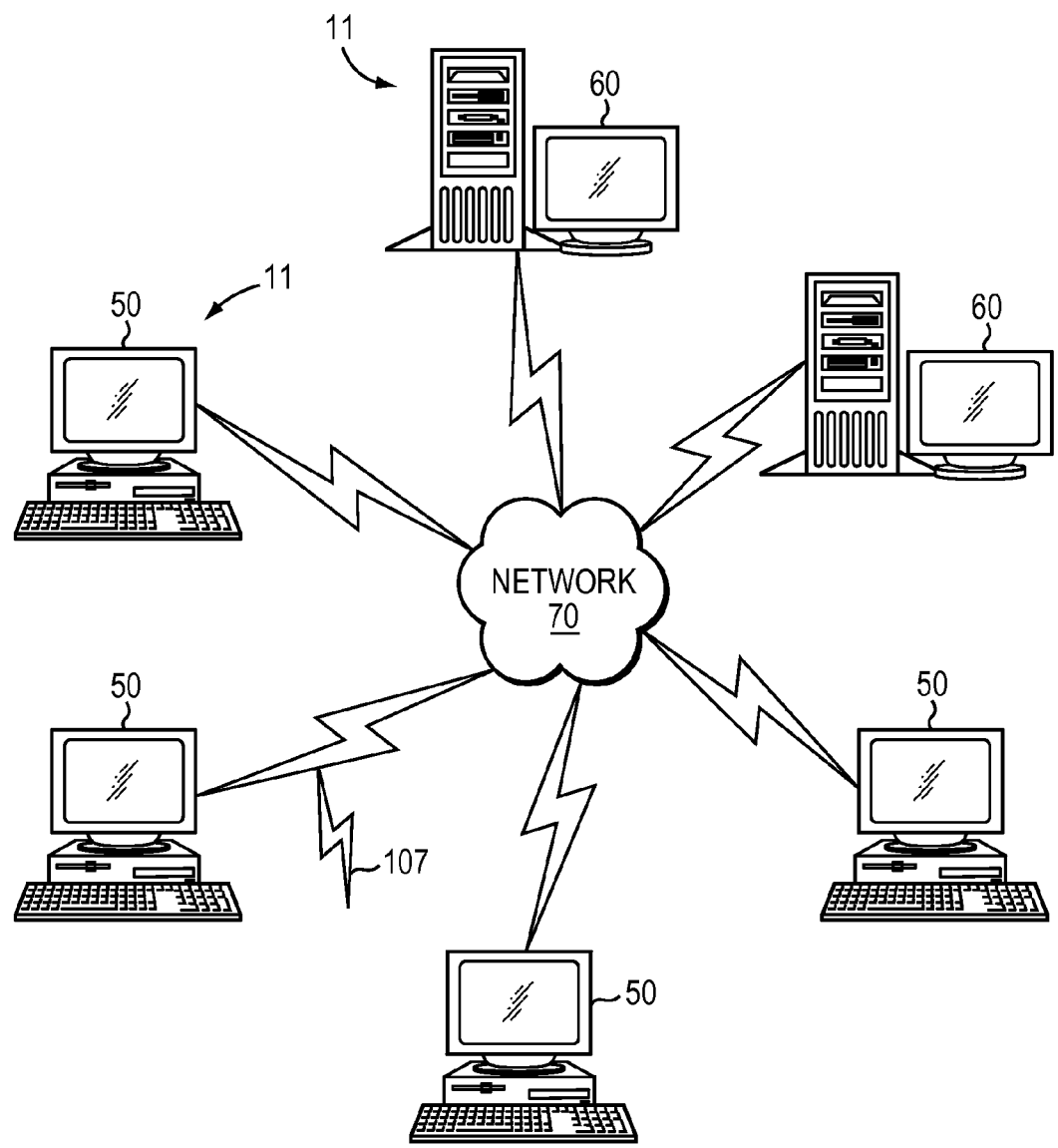
FIG. 1 is a schematic view of a computer network in which embodiments of the present invention are deployed.

FIG. 1 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 2:
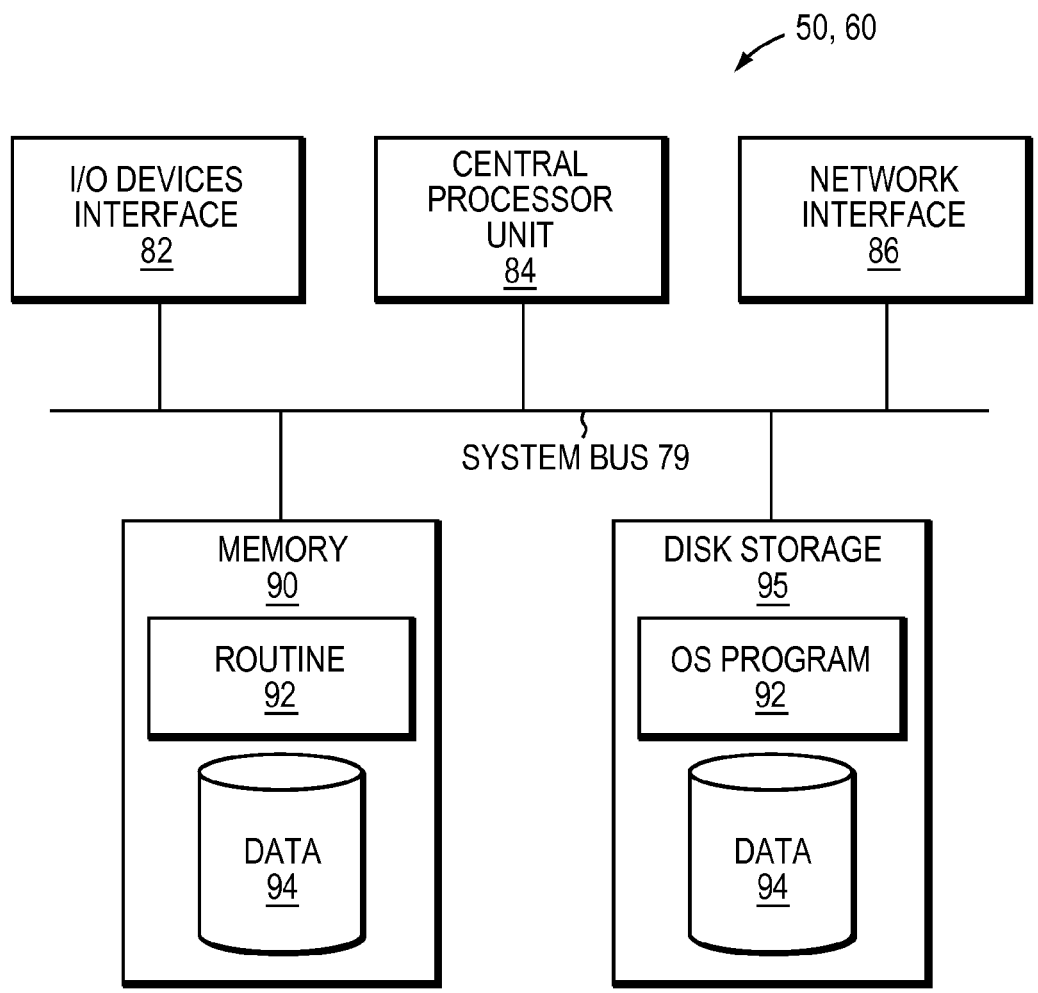
FIG. 2 is a block diagram of a computer node or device in the network of FIG. 1.

FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement an embodiment of the present invention (e.g., web service 20, email system 30, feed reader 40 and supporting code detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

At a mail server 60, processing is as follows:

1. An email message is received by the mail system using common or known techniques.

2. The invention system 11 (e.g. a rules engine or protocol transfer module) checks the received email message against a series of rules.

3. A preferred embodiment establishes rules that identify "non actionable" incoming email messages as good candidates for protocol transfer. However, any other rules could be employed as well.

4. Alternatively the user (email recipient or addressee) manually marks the received email message as a candidate for protocol transfer. Embodiments of the present invention accomplish this through a user interface command or tool or the like.

5. On positive match (Rule outcome), the invention system 11 or rules engine marks the subject email message as "to be served as a feed" either
   (i) as an entry in a single general feed or
   (ii) as an entry in a specific feed named by the user.
The marking is accomplished with a text label or similar known technique for marking and indicates this protocol change.

6. The invention system 11 removes the subject email message from the mail system and adds it to a feed object such as an RSS entry or similar object.

7. Alternatively, the invention system 11 removes the email message from the email system In-box and maintains it in a Transferred folder, an archive, or other repository. That is, the present invention system 11 may be configured to maintain data integrity through redundancy, to perform information tracking, etc.

8. The invention system 11 exposes various email content within these feed objects
   as a single feed entry,
   in a plurality of feed entries, or
   as an OPML file that lists all feed entries for a user,
   according to a filter (e.g. only email messages with certain tags) or
   any combination of the above.

9. The feed object can be configured to provide additional function such as:
   rolling of feed content (i.e. serve up only the most recent ten entries),
   periodic archive/expiry of content,
   hooks for email related function,
   replying to the subject message,
   placing the subject message back into the email system Inbox, and/or
   managing read/unread state.

At the user's feed reader client 50, the following processing occurs:

1. The user subscribes to feeds
   (a) of his unread email messages from the email system In-box (using known techniques),
   (b) of his unread labeled email messages (using known techniques), and/or
   (c) of all his feed-served content via an exposed OPML file.

2. The present invention enables the user to subscribe to these feeds individually according to the feeds now made available by the email client 50.

3. The user reads his feed entries, and 4. marks them read or unread.

5. If the user decides that he would like to handle a particular feed entry as email, then embodiments of the invention enable the user to 6. reply using a provided hook. In some embodiments, the reply mechanism and operation is configured with additional thread sending and tracking in the email client 50.

7. In turn, the invention system 11 moves the feed entry (its contents) as an email message back to the email Inbox given the provided hook. Of special note, in this invention is the notion of encapsulating the marked email content in "feed objects". While state of the art (i.e. Google, Inc.) techniques allow users to label email, and then get a feed from just the email with that label, that system/technique does not know that the user intended to read these messages in a feed reader. This precludes much of the function described above in the present invention.

It should be noted that the "protocol transfers" of the present invention described above need not be applied only to separate applications. Such transfers (conversions or the like) are equally valid for different user interfaces within a single application, or within different views of a single user interface within an application. An "aggregator" application, for example, might combine newsfeeds (entries) and emails (messages) into one display. One view of the display could show only email messages, another view only newsfeed entries, another view both. In the present invention, the "non-action" (and other appropriate) items could be one view, and the "action" items another view, regardless of whether the original information protocol was RSS or email.

Further examples of embodiments of the present invention that convert selected email messages into feed entries follow. Briefly, the below described web service embodiment (Example embodiment #1) could easily be implemented as a stand-alone service, with licensing implications. Services based on this concept can reduce the user labor of reading email messages, and the size of emailboxes (In-boxes). If the feature were added to IBM Lotus Notes (see the email embodiment, Example #2 below), it could provide advantages over existing email systems such as Microsoft Outlook and Google, Inc. Gmail. The below described feedreader embodiment (Example #3) could be part of Lotus Connections by IBM (assignee) for example. The ability for email readers to become feed publishers is consistent with the social computing goals of Lotus Connections.

Now described are three different embodiments for Applicants' core method of optimizing presentation of data items as a function of the data content, by transferring the data item from one protocol to a different protocol (e.g., converting emails/email messages into feeds/feed entries) according to principals of the present invention. Such optimization effectively reduces email In-box clutter and streamlines reading in feed readers.

Example Embodiment 1

Web Service

Figure 3:
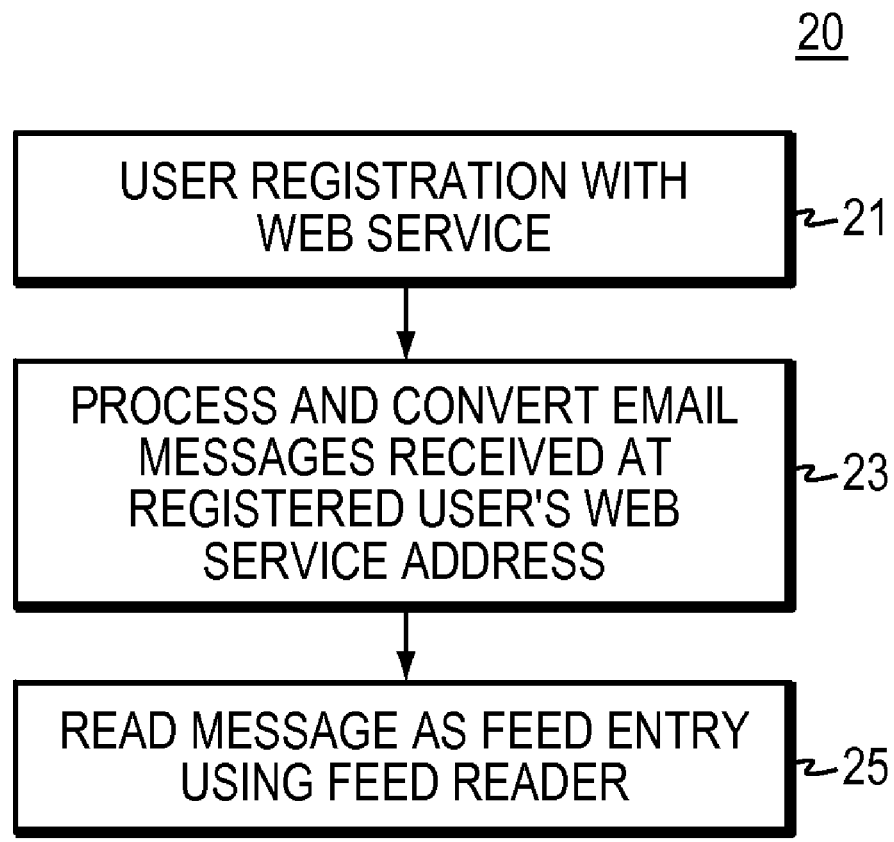
FIG. 3 is a flow diagram of an example web service embodiment of the present invention.

With reference to FIG. 3, illustrated is one exemplary, non-limiting web service embodiment. In that embodiment, a User registers 21 at the invention EmaiRSS web service 20.

In turn, the service 20 provides the user with an email address at the EmaiRSS service (e.g., John_Doe EmaiRSS.com). Optionally, the user specifies the name of the feed to be generated by the EmaiRSS service 20. Further optionally, the user specifies rules to sort email messages into each named feed (see section on "Rules," below).

In another option, the user requests a specialized email address for each feed to be generated for the user. In this case, the Web server 20 generates a special (respective) email address and displays it to the user.

Next the user provides the EmaiRSS email address (resulting from registration 21) to selected senders of emails. Email messages sent to the user's address at EmaiRSS are converted into feed(s)/feed entries by the web service system 20 (step 23) upon receipt. Optionally, the EmaiRSS services (step 23) send a periodic digest of its actions to the user, in the form of either an email message or a feed entry.

The user reads feed entries via her/his feed reader of choice (step 25). Optionally, the user can send a "remove" message (command or operation) to the web service 20 to remove an entry from the feed (e.g., in the event that private material was inadvertently included in the feed). Further, optionally, a user may provide an ad-hoc email address, constructed per certain rules, to a potential sender of emails. This ad-hoc address would be understood by the EmaiRSS service 20 as specifying the desired disposition of emails received. For example, John_Doe private.EmaiRSS.com would direct incoming email messages so addressed into an access-controlled ("private") feed. Another example: HCI_List.John_Doe EmaiRSS.com would direct incoming email messages so addressed into a namedfeed with the name "HCI List".

Example Embodiment 2

Email Enhancement

Figure 4:
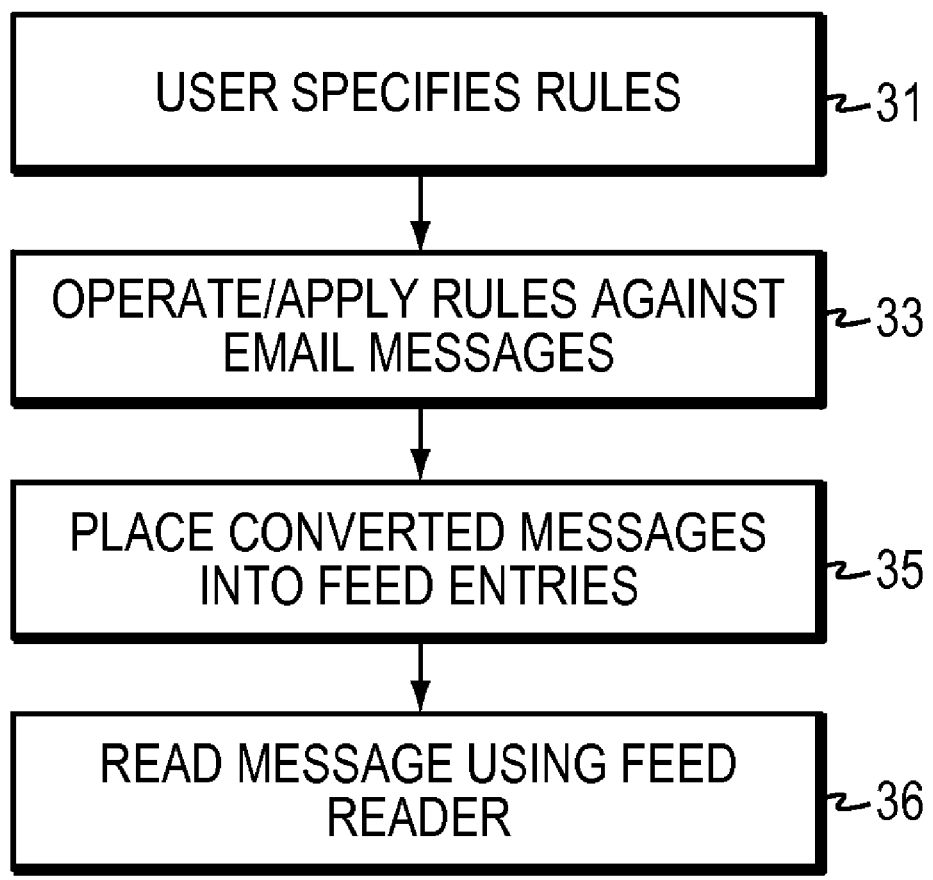
FIG. 4 is a flow diagram of an example email system embodying the present invention.

With reference to FIG. 4, within an enhanced email client 30, the user specifies rules 31 for the creation of a feed entry (see section on "Rules," below). Optionally, the user specifies the name of the feed to be generated. Optionally, the user specifies multiple sets of names and rules for the creation of more than one feed.

The Email system 30 (step 33) operates rules to select email messages for conversion into feed entries. Optionally, conversion takes place in one of two modules: email client 50 (FIG. 1) or in email server (such as at 60 in FIG. 1). Optionally, conversion occurs in one of two scheduling modes: periodically, or upon receipt of a subject email message.

At step 35, the Email system 30 places converted messages into one or more feed entries. Optionally, the email system 30 deletes corresponding email messages from the inbox. Optionally, the email system 30 moves subject email messages from the inbox into a folder, with the option to create a respective folder for each generated feed. Optionally, the email system 30 automatically deletes subject messages from feed after a specified time (specified by user or by policy).

The user reads feed entries via her/his feed reader of choice (step 36). Optionally, the user can send a "remove" message (command or operation) to the email feed service 30 to remove a converted message (entry) from the feed (e.g., in the event that private material was inadvertently included in the feed).

Example Embodiment 3

Feed Reader Enhancement

Within an enhanced feed reader 40 (FIG. 5), the user specifies rules 41 for selecting email messages from his email inbox. Optionally, the user specifies the name of the feed to be generated. Optionally, the user specifies multiple sets of names and rules for the creation of more than one feed.

The feed reader 40 (step 42) operates rules to select email messages from the user's email inbox for conversion into feed entries. Optionally, the feed reader 40 operates on the email inbox in one of two modules: client 50 (FIG. 1) or in server 60 (FIG. 1). Optionally, the feed reader 40 deletes subject email messages from the email inbox. Optionally, the feed reader 40 moves email messages from the email inbox into an email folder, with option to create a respective folder for each generated feed.

Subsequently, at step 44, the user reads feed entries via the invention enhanced feed reader 40, or via her/his feed reader of choice. Optionally, the user can send a "remove" message (command or operation) to the feed service 40 to remove an entry from the feed (e.g., in the event that private material as inadvertently included in the feed).

Example Hybrid of Embodiments 2 and 3

Email and Feed Reader Partnership

Preparation

In this embodiment, initial system preparation includes the following. In the email client 30, the user specifies rules for moving selected email messages into specially-named email folders. In an enhanced feed reader 40, the user specifies rules for reading the specially-named email folders.

Execution

After the foregoing system preparations (initialization) system operation is as follows. Automatically, email client 30 (or server) executes the rules to move selected email messages into the designated email folders. Automatically or responsive to user action, the feed reader 40 accesses the email folders and creates feed (that is, generates feed entries from the selected email messages stored in the email folders). In turn, the user reads the generated feed entries. Optionally, the user can send a "remove" message (command or operation) to the feed service 40 to remove a message/entry from the feed (e.g., in the event that private material as inadvertently included in the feed).

In addition to the foregoing embodiments, further features of the present invention may provide the following.

Publication

Optionally, the feed, which was created by the prior methods, may be private for the user who created them. Optionally, the name of the feed may be hidden. Optionally, authentication may be required to read the feed. Optionally, the contents of the feed may be encrypted. Know techniques for each of these options are suitable.

Optionally, the feed, which was created by the prior methods, may be published for reading by other users. In that case, the invention system 11 enables a user to optionally, send a "remove" message (command or operation) to the feed service to remove a message/entry from the feed (e.g., in the event that private material was inadvertently included in the feed).

Rules

There is a long tradition of creating rules (scripts) and script-execution engines for processing the contents of an email folder (e.g., "folderization" methods, going as far back as the "Information Lens" project at MIT Sloan School in the late 1980s). The present invention utilizes those rules making and processing techniques. In particular, the present invention 11 provides the following types of rules:

Specialized feed entry-creation rules; and

Privacy rules: Rules that require user approval before an email message is converted into a feed entry, for conditions such as mention of the word "private";

mention of the word "personal"; and mention of the word "password".

Users may also write their own privacy rules.

Headers and Additional Information

Users with specialized information needs (such as more than one feed) may use email addresses or header-like constructions inside their email messages, in order to affect the resulting feed. Two examples of this are use of particularized (certain) feed names and tag on feeds.

With respect to use of specific feed name, one method, mentioned above under example Embodiment 1, enables the user to request a feed-specific email address. The user then specifies that feed-specific address to each of the email sources that are to be sent to the web service. A second method (e.g., in example Embodiments 2 and 3 and hybrid 2-3) involves writing additional rules that determine the feed name based on text in the header or contents of the email message.

With respect to tags on feeds, the user may write additional rules that generate tags on each feed item based on the header or contents of the email message.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 5:
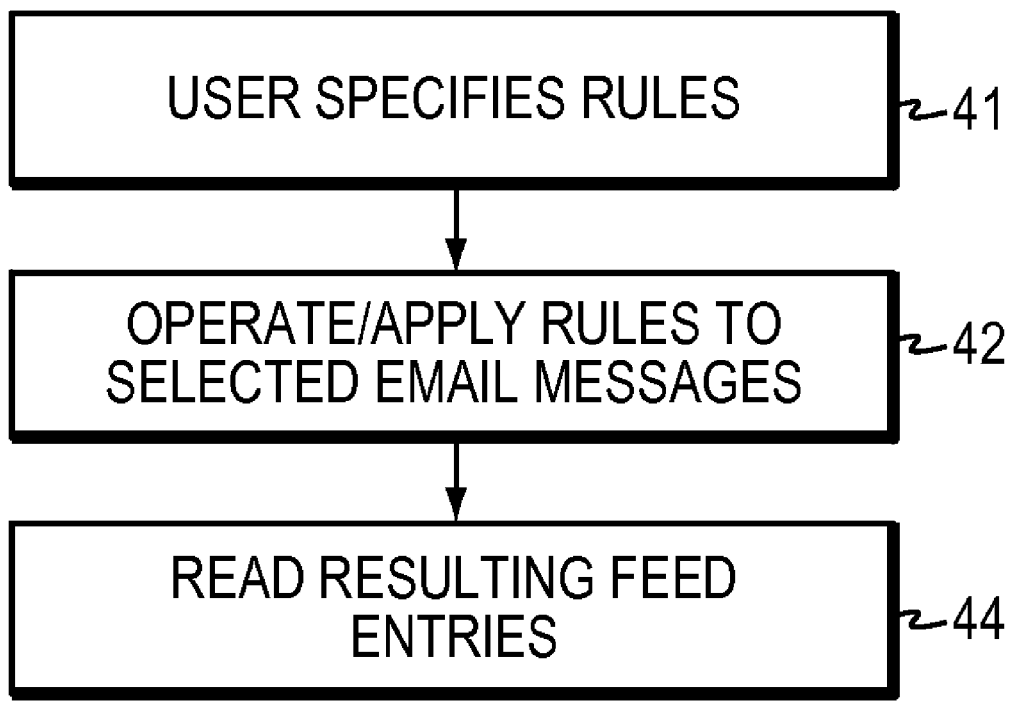
FIG. 5 is a flow diagram of an example feed reader system embodying the present invention.

With regard to FIGS. 3-5, it is understood that a variety of steps may be used to implement embodiments of the present invention. It is further understood that embodiments may be implemented with other than rules-based approaches. Generally speaking, embodiments of the present invention intercept certain email messages and convert or otherwise transfer the subject messages to feed entries. Lastly, invention systems enable the user/addressee to then view the resulting feed entries through a feed reader.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer method of data handling comprising:
using a digital processor:
receiving a data item in one protocol;
optimizing presentation of data contents of the received data item by selectively transferring the data item from the one protocol to a different protocol as a function of the data contents of the received data item, said transferring resulting in the data item being in a form acceptable by the different protocol and wherein said optimizing effectively reduces email in-box clutter and streamlines reading in feed readers; and
outputting the resulting form of the data item in a manner that is viewable by a user using the different protocol.

2. A method as claimed in claim 1 wherein:
the received data item is an email message, and
the step of selectively transferring the data item includes, where feed entry form of the email message optimizes presentation of contents of the email message, then converting the email message to a feed entry readable through a feed reader.

3. A method as claimed in claim 2 further comprising the step of establishing rules that identify "non-actionable" email messages as good candidates for protocol transfer.

4. A method as claimed in claim 2 further comprising the step of enabling the user to handle the feed entry as email including enabling the user to reply using email.

5. A method as claimed in claim 1 wherein the one protocol is an email protocol.

6. A method as claimed in claim 1 wherein the different protocol is a machine-readable feed protocol.

7. A method as claimed in claim 6 wherein the step of selectively transferring results in the data item being a feed entry in a general feed.

8. A method as claimed in claim 6 wherein the step of selectively transferring results in the data item being a feed entry in a specific user named feed.

9. A method as claimed in claim 1 wherein the method is rules-based.

10. A computer data handling system, comprising:
a member receiving an information object in one protocol;
a protocol transfer module responsive to the received information object and optimizing presentation of contents of the received information object, wherein as a function of contents of the received information object, the protocol transfer module selectively transferring the received information object from the one protocol to a different protocol and wherein the optimizing effectively reduces email In-box clutter and streamlines reading in feed readers; and
an output member displaying to a user the transferred information object in the different protocol as optimized.

11. A computer data handling system as claimed in claim 10 wherein the received information object is an email message, and
the protocol transfer module selectively converts the email message to a feed entry readable through a feed reader, where feed entry form of the email message optimizes presentation of contents of the email message.

12. A computer data handling system as claimed in claim 11 further comprising a rules engine having rules that identify non-actionable email messages as good candidates for protocol transfer.

13. A computer data handling system as claimed in claim 11 wherein the protocol transfer module further enables the user to handle the feed entry as email including enabling the user to reply using email.

14. A computer data handling system as claimed in claim 10 wherein the one protocol is an email protocol.

15. A computer data handling system as claimed in claim 10 wherein the different protocol is a machine-readable feed protocol.

16. A computer data handling system as claimed in claim 15 wherein the protocol transfer module effectively converts the information object into one or more feed entries.

17. A computer data handling system as claimed in claim 16 wherein the one or more feed entries are in a general feed.

18. A computer data handling system as claimed in claim 16 wherein the one or more feed entries are in a specific user-named feed.

19. A computer data handling system as claimed in claim 10 wherein the protocol transfer module is rules-based.

20. A computer program product managing data comprising:
a computer readable storage medium having embedded therewith computer useable program code directing a computer processor in data handling, the computer useable program code comprising:
computer useable program code configured to receive a data item in one protocol;
computer useable program code configured to optimize presentation of data contents of the received data item by, as a function of data contents of the received data item, selectively transferring the data item from the one protocol to a different protocol, said selectively transferring resulting in the data item being in a form acceptable by the different protocol, and said optimization effectively reducing email In-box clutter and streamlining reading in feed readers; and
computer useable program code configured to output the resulting form of the data item in a manner that is viewable by a user in the different protocol.

* * * * *